Nov. 2, 1937.  I. I. SIKORSKY  2,097,990
ADJUSTING MEANS FOR CONTROL SURFACES
Filed Sept. 5, 1935   5 Sheets-Sheet 1

INVENTOR.
IGOR I. SIKORSKY
BY Harris G. Luther
ATTORNEY

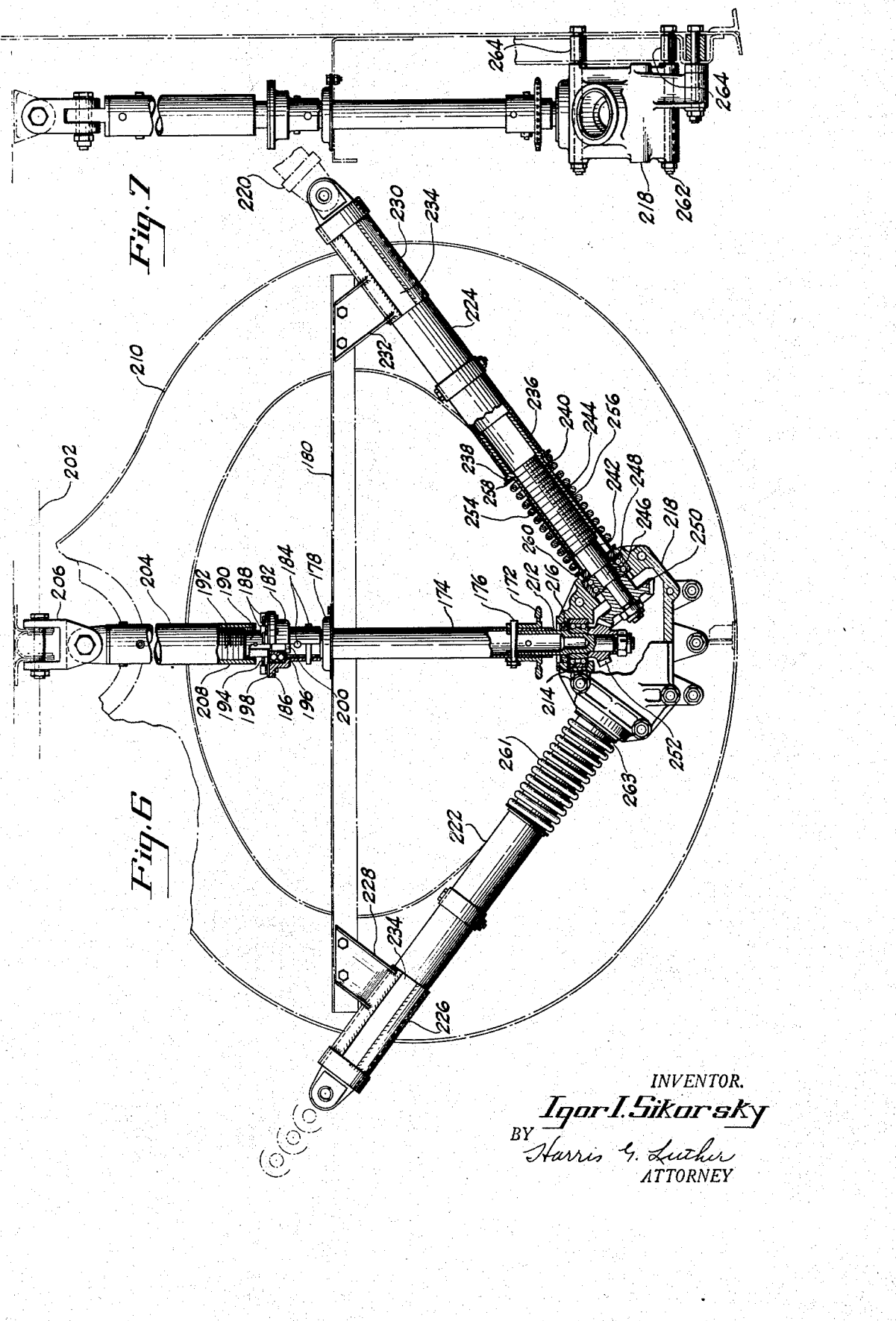

Patented Nov. 2, 1937

2,097,990

UNITED STATES PATENT OFFICE 2,097,990

ADJUSTING MEANS FOR CONTROL SURFACES

Igor I. Sikorsky, Trumbull, Conn., assignor to United Aircraft Corporation, East Hartford, Conn., a company of Delaware Application September 5, 1935, Serial No. 39,245

6 Claims. (Cl. 244—87)

This invention relates to improvements in adjusting means for control surfaces and has particular reference to means for adjusting the stabilizing surfaces of airplanes.

One object of the invention resides in the provision of a construction by means of which the control surfaces may be easily and quickly adjusted by means of a remote control.

A further object resides in the provision of a construction by means of which both the control surface, such as the stabilizer of an airplane, and the braces used to reinforce such a control surface may be simultaneously adjusted by a single remote control device such as a hand wheel or lever located in the operating compartment of the airplane.

Other objects and advantages will be pointed out hereinafter or will become apparent as the description proceeds.

In the accompanying drawings in which like reference numerals are used to designate similar parts throughout, there is illustrated a suitable mechanical embodiment of what is considered to be the preferred form of the invention and one somewhat modified form thereof. The drawings however are for the purpose of illustration only and are not to be taken as limiting the invention the scope of which is to be measured entirely by the scope of the appended claims.

In the drawings, Fig. 1 is a side elevational view of an airplane having control surfaces, a portion of the airplane being broken away to illustrate the application thereto of a part of the device of the invention.

Fig. 6 is a sectional view similar to Fig. 5 showing a modified form of control surface adjusting means, certain portions of the adjusting means being broken away to better illustrate the construction thereof.

Fig. 7 is a side elevational view of the control surface adjusting means illustrated in Fig. 6, certain elements thereof being omitted to simplify the illustration.

Figure 1:
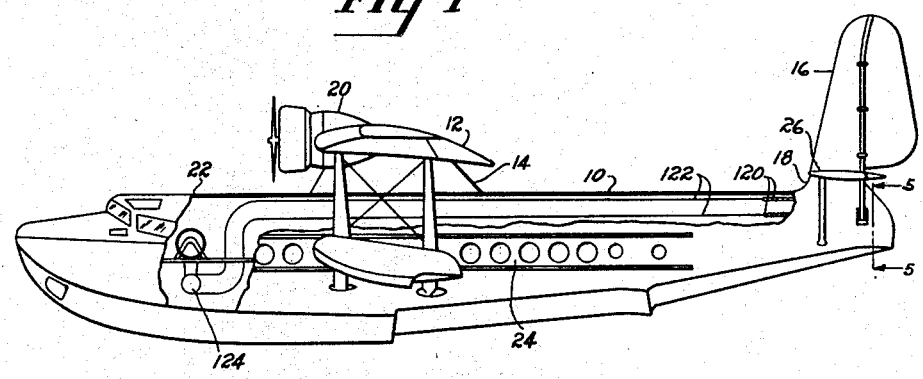
Figure 2:
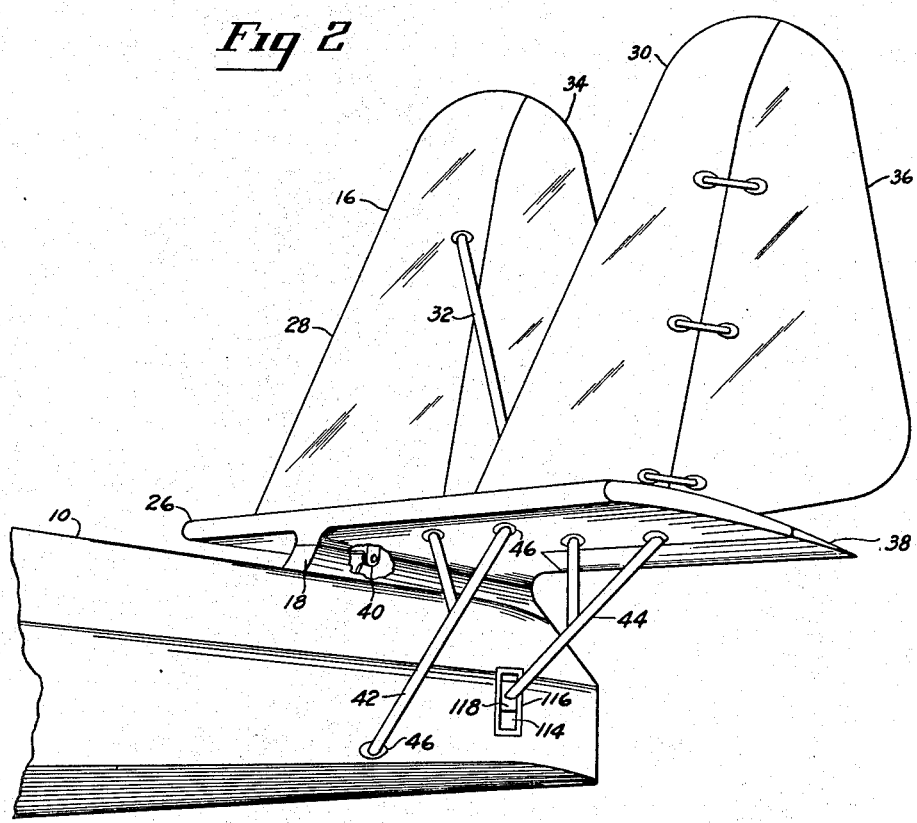
Fig. 2 is a perspective view of the rear portion of the hull or fuselage and the empennage of an airplane showing the control surfaces and suitable braces for reinforcing such control surfaces.

Referring to the drawings in detail, Fig. 1 illustrates a suitable airplane to which the device of the invention may be applied, in this instance a multi-motored flying boat. It is to be understood however that the device of the invention is not limited to the type of airplane illustrated, but may be applied to any airplane having a braced stabilizer. The airplane illustrated comprises a hull 10 upon which is mounted a wing 12 by means of a suitable tower support 14, and an empennage, generally indicated at 16, which is mounted upon the hull 10 by a tower support 18, similar in general form to the tower support 14. The ship is powered by a plurality of wing carried engines as indicated at 20, and the hull contains a pilot's cabin 22 and a passenger compartment 24 between the pilot's cabin and the empennage 16.

The empennage generally indicated at 16 comprises a horizontal stabilizer 26 upon the upper surface of which are mounted a pair of vertical stabilizers 28 and 30 which are braced in position upon the horizontal stabilizer by suitable brace members as indicated at 32. These vertical stabilizers 28 and 30 carry hinged rudder members 34 and 36 respectively to assist in steering the ship when in flight. The horizontal stabilizer 26 is provided with a pair of elevator surfaces one of which is indicated at 38, for steering the ship in its vertical movements. As mentioned above, the empennage which comprises the horizontal stabilizer 26, the vertical stabilizers 28 and 30, the vertical rudders 34 and 36, and the elevators 38, is secured upon the hull by means of the tower support 18. In order to provide for angular adjustment of the horizontal stabilizer 26 to compensate for variations in the load distribution in the airplane and maintain the tendency of the airplane to fly on an even keel, the stabilizer is hinged to the tower support by a suitable longitudinal hinged connection 40.

In order to maintain the horizontal stabilizer 26 in longitudinal parallelism with the wing 12, the stabilizer is braced to the hull by two sets of suitable braces as indicated at 42 and 44. Each set of braces 42 and 44 comprises a pair of similar strut members positioned one upon each side of the hull 10 and located in a plane normal to the longitudinal axis of the hull. The struts 42 are secured to the hull and to the horizontal stabilizer 26 by suitable pivotal conections as indicated at 46 and these brace members lie in a transverse plane including the axis of the hinged connection 40 so that they do not interfere with the tilting movements of the horizontal stabilizer about the hinge. The brace struts 44 are positioned rearwardly of the struts 42 and in a location at which the surface of the stabilizer to which the struts are attached moves relative to the hull. It is, therefore, apparent that when the stabilizer is adjusted to change its angular relation to the axis of the hull, the brace struts 44 must also be adjusted to compensate for the changes in the position of the stabilizer relative to the hull.

Figure 5:
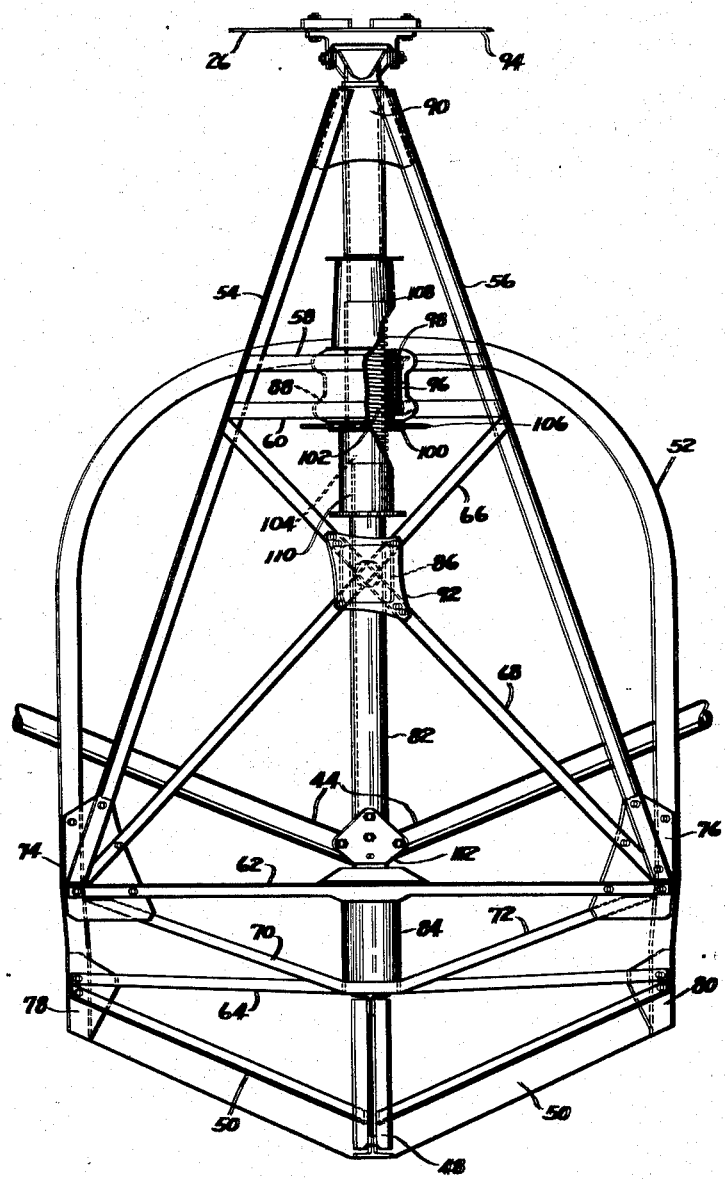
Fig. 5 is a sectional view on an enlarged scale on the line 5—5 of Fig. 1 showing a portion of the frame of the fuselage or hull and the construction of the control surface adjusting means.

The stabilizer adjusting mechanism is particularly illustrated in Fig. 5. This figure illustrates a cross section of the framework of the hull at a station near the rear end thereof and shows the construction of the stabilizer adjusting means and the manner in which the adjusting means is mounted in the framework of the hull. In this figure the numeral 48 indicates the keel of the hull to which are connected the bottom ribs 50 which in turn are united at their outer ends to the ends of an inverted U shaped frame member 52. A pair of oppositely disposed frame stanchion members 54 and 56 are connected at their lower ends to the lower portion of the U frame member 52 and extend upwardly above the U frame member to constitute an A frame to form one of the frame stanchions of the tower support 18. These major frame members are rigidly braced by means of the transverse members 58, 60, 62 and 64 and the diagonal members 66, 68, 70 and 72 reinforced at their adjoining ends by suitable means such as the gusset plates 74, 76, 78 and 80.

The stabilizer 26 is adjusted by means of a screw jack including a vertical axially movable tubular member 82 supported in vertical axially aligned bearings 84, 86, 88 and 90 carried by the frame of the hull. The bearing 84 is supported by the transverse brace members 62 and 64 and the diagonal members 70 and 72 upon the upper surface of the keel 48. The bearing 86 is supported by a gusset plate 92 secured to the diagonal members 66 and 68 at the point at which they cross each other. The bearing 88 is carried by the transverse members 58 and 60 and the bearing 90 is secured to the stanchion members 54 and 56 at the top of the A frame. The tubular member 82 is connected by means of a suitable pivotal hinge connection 94 to the undersurface of the horizontal stabilizer 26 at a location directly rearward of the hinge 40. Vertical movement of the member 82 to adjust the stabilizer 26 is imparted by means of a rotatable cylinder 96 mounted in suitable thrust bearings 98 provided in the bearing 88 and having internal screw threads 100 which cooperate with external screw threads 102 provided on a sleeve 104 secured upon that portion of the vertical member 82 included in and adjacent to the bearing 88. The rotatable portion of the screw jack comprising the cylinder 96 is rotated by a sprocket 106 which is connected by suitable means, presently to be described, with a remote control device located in the pilot's cabin of the airplane. Above the bearing 88 the sleeve 104 and a portion of the tubular member 82 is covered by a sleeve 108 and below the bearing 88 the sleeve 104 and a portion of the member 82 are covered by the sleeve 110 similar to the sleeve 108. The sleeves 108 and 110 are provided to protect the screw threads 100 and 102 against the intrusion of foreign matter such as grit and moisture and also to provide a seal for lubricant so that the necessary quantity of lubricant may be maintained in the bearing 88 and between the cooperating screw threads 100 and 102.

From the above description it will be observed that rotation of the sprocket 106 will rotate the attached cylinder 96 and by reason of the cooperation of the screw threads 100 and 102 this rotation of the sprocket will move the tubular member 82 vertically up and down relative to the frame of the hull and will thereby operate the screw jack to adjust the horizontal stabilizer 26 to which it is attached by the hinged connection 94 about the hinge 40 to change the angular relation of the stabilizer to the hull.

The inner ends of the brace members 44 are not connected to the frame of the hull as are the ends of the brace members 42, but instead pass through the hull and are connected to the lower end of the member 82 by suitable means such as the bearing plates, one of which is indicated at 112. Thus, when the member 82 is moved vertically to adjust the horizontal stabilizer the brace members 44 will be moved by the same amount, thus maintaining constant the relation between the brace members and the stabilizer. The member 82 to which the struts 44 are attached is solidly supported in the hull by the bearings 84, 86, 88 and 90 so that it easily takes the loads imposed by the brace struts.

Since the brace members move relatively to the hull, it is obviously necessary to provide an enlarged opening in the hull at the point at which the brace members pass therethrough. This enlarged opening is in the form of a vertical slot 114 in which the brace members 44 may move up and down. This slot is surrounded by a frame 116 longer than the slot and having inturned edges which overlie the edges of a slidable plate member 118 through the center of which the brace 44 passes. The plate members as indicated at 118 are of a sufficient length to completely cover the slots in any adjusted position of the brace members 44 and constitutes cover plates which at all times cover the openings through which the brace members enter the hull.

The sprocket 106 is rotated by a length of chain 120, the ends of which are connected to the ends of a cable 122 which is wound, intermediate its length, around a sheave 124 positioned below the floor of the pilot's cabin of the airplane. The cable 122 is led through suitable conduits past the passenger compartment 24 and through the rear portion of the hull to the sprocket 106 so that rotational movement imparted to the sheave 124 is transmitted to the sprocket to rotate the sprocket and thereby operate the screw jack to adjust the angular relation of the empennage to the hull.

The sheave 124 is mounted upon an axle 126 supported in suitable bearings as indicated at 128, 130 and 132 carried by the frame member 133 which is secured at its ends to the ribs of the hull, and to the floor 134 of the pilot's cabin. A pair of sprockets 136 and 138 are non-rotatably mounted at spaced points upon the axle 126 and are connected by means of suitable chains 140 and 142 with sprockets 144 and 146 respectively. The sprockets 144 and 146 are mounted upon axles 148 and 150 supported in the upper portions of respective A frames 152 and 154 mounted upon the frame members 156 and 158 which support the inner sides of the pilots' seats. Hand wheels 160 and 162 are mounted upon the inner or adjacent ends of the axles 148 and 150 respectively by means of axially movable connections 164 and 166 so that the wheels may be moved relative to the respective A frames 152 and 154 to provide an increased width of the passage between the wheels so that the pilots may pass therebetween to the pilots' seats. Each of the hand wheels 160 and 162 is provided with an indicator 168 and 170 respectively geared to the axles 148 and 150 for indicating the angular adjustment of the empennage.

From the above description it will be observed that manual rotation of either of the hand wheels 160 or 162 will be transmitted through the chains 140 and 142 and the sprocket 136 or 138 to the axle 126, from the axle 126 to the sheave 124, and from the sheave through the cable 122 and chain 120 to the sprocket 106, and that by this arrangement adjustment of the empennage may be easily and quickly obtained by the remote control device illustrated and described.

While there has been illustrated and described a specific remote control device including the hand wheels, A frames, chains, sprockets, axle and sheave, it is to be understood that the invention is not necessarily limited to this specific construction, but that other suitable forms of remote control may be utilized without exceeding the scope of the invention.

In the modified form of stabilizer adjusting device illustrated in Figs. 6 and 7, power is transmitted from a suitable remote control device to a chain sprocket 172 non-rotatably secured upon a tubular member 174 by suitable means such as the tapered pin 176. The tubular member 174 extends upwardly from the sprocket 172 through a bearing 178 supported upon a transverse frame member 180. Above the bearing 178 a sleeve 182 is secured upon the member 174 by a suitable means such as the tapered pins 184. At its upper end the sleeve 182 is provided with a flanged cup portion 186 into the flange portion of which are inserted a plurality of screws 188 having cylindrical heads. A member 190 provided with external screw threads 192 is connected to the member 174 by means of a universal connection which comprises a plate 194 rigidly secured to the member 190 and having apertures in its outer edge which engage the cylindrical heads of the screws 188 and a self-aligning bearing 196 disposed within the cup portion 186 of the member 182 and maintained therein by a washer 198 which overlies the outer race of the bearing 196 and is held in position by the heads of the screws 188. A cap screw 200 is inserted through the inner race of the bearing 196 and screw threaded into the lower end of the member 190 to rigidly connect the member 190 to the inner race of the bearing.

From this description it will be observed that, while rotational force may be transmitted from the member 174 to the member 190 through the notched plate 194 and screws 188 and axial thrust may be transmitted through the self-aligning bearing 196 of the universal joint, the member 190 has a slight degree of freedom for angular movement with respect to the member 174. The members 174, 182 and 190 comprise the rotatable portion of a stabilizer adjusting screw jack, the axially movable portion of which comprises a sleeve or tubular member 204 connected to the undersurface of the stabilizer 202 by a suitable universal joint 206, and receiving at its lower end the screw threaded portion of the member 190. This member 204 is provided in its lower portion with internal screw threads 208 which cooperate with the screw threads 192 so that when the member 174 is rotated by the sprocket 172 the member 204 will be adjusted up and down by the cooperating screw threads 192 and 208 to adjust the angular relation of the stabilizer 202 to the fuselage of which the frame 210 forms a part, to compensate for variations in the loading of the vehicle to which the stabilizer adjusting mechanism is attached.

At its lower end the member 174 receives a hollow bearing plug 212 which is rotatably mounted by means of an antifriction thrust bearing 214 in an aperture 216 provided in the upper portion of a gear box 218 secured to the lower portion of the frame 210.

As described above, the stabilizer 202 is reinforced by one or more sets of braces, one set of which lies substantially in a plane transverse to the fuselage or hull of the vehicle which plane contains the axis of the members 74 and 204. This last mentioned set of braces comprises a pair of struts one of which is indicated at 220 each having one end pivotally connected to the undersurface of the stabilizer in alignment with the universal connection 206 and having its opposite end pivotally connected to a member carried by the fuselage frame. It is obvious that as the stabilizer adjusting screw jack is expanded or contracted the length of the brace struts referred to or the location of the connection of such struts to the fuselage frame must be simultaneously adjusted to accommodate the struts to the changed position of the undersurface of the stabilizer. This adjustment can be accomplished either by changing the location of the connection between the struts and the supporting member carried by the fuselage frame, as already explained in the description of Fig. 5, or by changing the length of the struts rather than by changing the location of their connection to the fuselage frame.

As a suitable method of changing the length of the struts, as illustrated in Fig. 6, the struts 220 are pivotally connected to the outer ends of tubular members 222 and 224 which extend from a position at the lower central portion of the interior of the fuselage upwardly and outwardly to the exterior of the fuselage. As the construction of both of the strut adjusting members is the same, it is believed that a description of only one is sufficient for the purpose of this disclosure. The tubular member 224 is slidably supported in a sleeve bearing 230 secured to the frame by a suitable bracket 232, an opposite tubular member 222 being supported in a similar sleeve bearing 226 secured to the frame by a bracket 228. The tubular members are restrained against rotation in the bearing sleeves 230 and 226 by longitudinal grooves and splines as indicated at 234. The tubular member 224 telescopically receives at its inner end a hollow, substantially cylindrical member 236 provided intermediate its length with a radial flange 238 and provided interiorly thereof, in the portion between the flange and its inner end, with internal screw threads 240. A plug member 242 having external screw threads 244 is screw threaded into the member 236 and is provided with a reduced end portion 246 upon which is secured the inner race of a thrust bearing 248 and a gear 250. A gear 252 upon the end of the bearing plug 212 within the gear box 218 meshes with the gear 250 and with a similar gear, not illustrated, operatively connected with the tubular member 222 so that, when the member 174 is rotated by the sprocket 172, the screw threaded plug 242 and the similar plug operatively associated with the tubular member 222 will be rotated in opposite directions and the cooperation of the screw threads 240 and 244 will move the members 222 and 224 in and out to adjust the length of the brace struts 220 to the changes in the position of the undersurface of the stabilizer 202. A coiled compression spring 254 surrounds the member 240 between the flange 238 and the gear box 218 to impose a resilient outward thrust on the member 224 at all times, the purpose of this spring thrust being mainly to counteract the load of the empennage on the threads and bearings of the strut adjusting mechanism to relieve the friction on these movable parts and also to resiliently absorb, to some extent, any vibration transferred to the strut from the stabilizer 202. Preferably a sleeve 256 is interposed between the inner surface of the spring 254 and the outer surface of the member 240 and washers 258 and 260 are disposed between the adjacent end of the spring and the flange 238 and the opposite end of the spring and the gear box 218 respectively. A similar spring 261 and sleeve 263 surround the inner end of the member 222. The gear box 218 is secured to the frame member by suitable through bolts as indicated at 262, suitable spacers 264 being interposed between the gear box and certain portions of the frame to reinforce the portion of the frame to which the gear box is attached.

Figure 3:
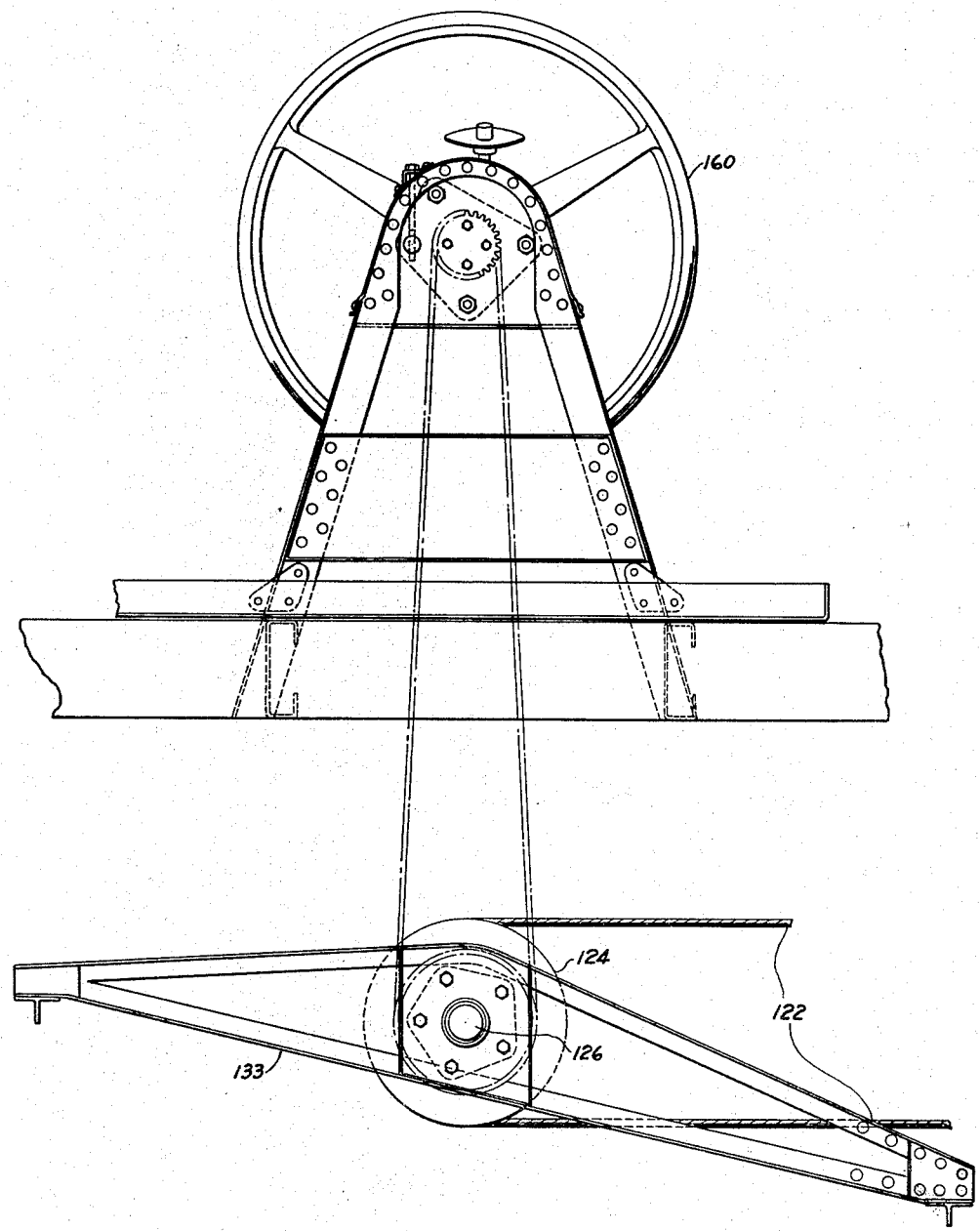
Fig. 3 is a side elevational view on an enlarged scale of a suitable hand wheel and power transmitting means for adjusting the control surfaces illustrated in Fig. 2.
Figure 4:
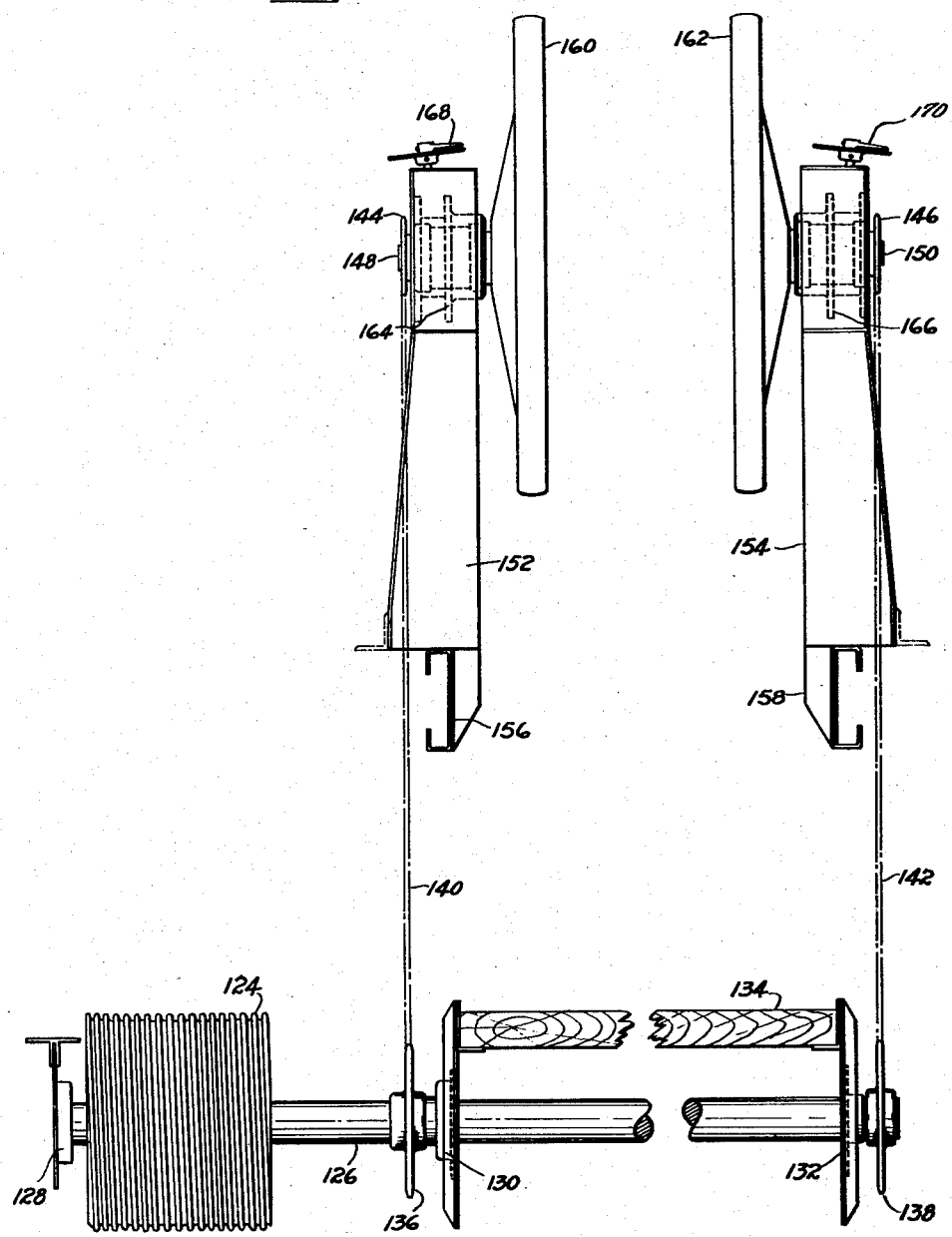
Fig. 4 is an end elevational view of the hand wheel and power transmitting means illustrated in Fig. 3.

The sprocket 172 is rotated by a suitable remote control means such as that described in the explanation of Figs. 3 and 4, although a different form of remote control device may be employed without in any way exceeding the scope of the invention.

While there has been illustrated and described a specific mechanical embodiment of the idea of the invention, it is to be understood that the invention is not limited to the specific arrangement so illustrated and described, but that such changes in the size, shape and arrangement of parts may be resorted to as come within the scope of the sub-joined claims.

Having now described the invention so that others skilled in the art may clearly understand the same what it is desired to secure by Letters Patent is as follows:

What I claim is:

1. In an airplane, a fuselage, a stabilizer adjustably mounted on said fuselage, an extensible strut comprising a screw jack having an axially movable member and a rotatable member disposed between said fuselage and said stabilizer for adjusting said stabilizer, a set of braces extending from opposite sides of said stabilizer into said fuselage, and means operatively connected with the rotatable portion of said screw jack for adjusting the length of said braces to accommodate the braces to the various adjusted positions of the stabilizer.

2. In an airplane, a fuselage, a stabilizer adjustably mounted on said fuselage, an extensible strut comprising a screw jack having an axially movable part and a rotatable part in said fuselage disposed between a supporting portion of said fuselage and said stabilizer for adjusting said stabilizer, a set of braces extending from opposite sides of said stabilizer into said fuselage, a fixed member in said fuselage to which the inner ends of said braces are connected, a screw joint in each of said braces, and means operatively connecting the rotatable part of said screw jack with said screw joints to adjust the length of said braces to correspond to the various adjusted positions of said stabilizer.

3. In an airplane, a fuselage, a stabilizer adjustably mounted on said fuselage, a screw jack comprising an axially movable part and a rotatable part within said fuselage for adjusting said stabilizer, a gear box within said fuselage within which the rotatable part of said screw jack is supported against axial movement, a gear on said rotatable part within said gear box, a set of braces extending from opposite sides of said stabilizer to said gear box, a screw joint in each of said braces for changing the length thereof to correspond with changes in the length of said screw jack, and a gear on each of said braces within said gear box meshing with the gear on the rotatable part of said screw jack to operate said screw joints simultaneously with the operation of said screw jack.

4. In an airplane, a fuselage, a stabilizer adjustably mounted on said fuselage, a screw jack comprising an axially movable member and a rotatable member in said fuselage for adjusting said stabilizer, a fixed member within said fuselage for supporting said rotatable part against axial movement, a set of braces extending from opposite sides of said stabilizer to said fixed member, screw joints in said braces, means connecting said rotatable part with said screw joints for adjusting the length of said braces to correspond to changes in the length of said screw jack, a radial flange on each of said braces, and a coiled compression spring surrounding each brace between said flange and said fixed member to resiliently urge said braces outwardly with respect to said fixed member.

5. In an airplane, a hull, a tower support on said hull, an empennage adjustably mounted on said tower support, a member extending between said empennage and said fuselage including a screw jack comprising an axially movable member and a rotatable member positioned within said hull for adjusting said empennage, a fixed member within said hull for restraining said rotatable member against axial movement, a set of braces extending from opposite sides of the undersurface of said empennage to said fixed member, and means operatively connected with the rotatable member of said screw jack for changing the length of said braces to correspond to changes in the length of said screw jack.

6. In combination with an airplane body, a control surface hingedly connected to said body at the rear thereof, screw operated means for adjusting said control surface, a set of braces between said control surface and said body, means operated by said screw operated means for changing the length of said braces, and manually operable remote control means for operating said screw operated means and said brace length changing means to alter the setting of said control surface.

IGOR I. SIKORSKY.